2 Sheets—Sheet 1.
W. P. & W. T WOOD,
Assignors, by mesne assignments, to I. R. BLUMENBERG,
Vapor Engine.
No. 9,400. Reissued Oct. 5, 1880.
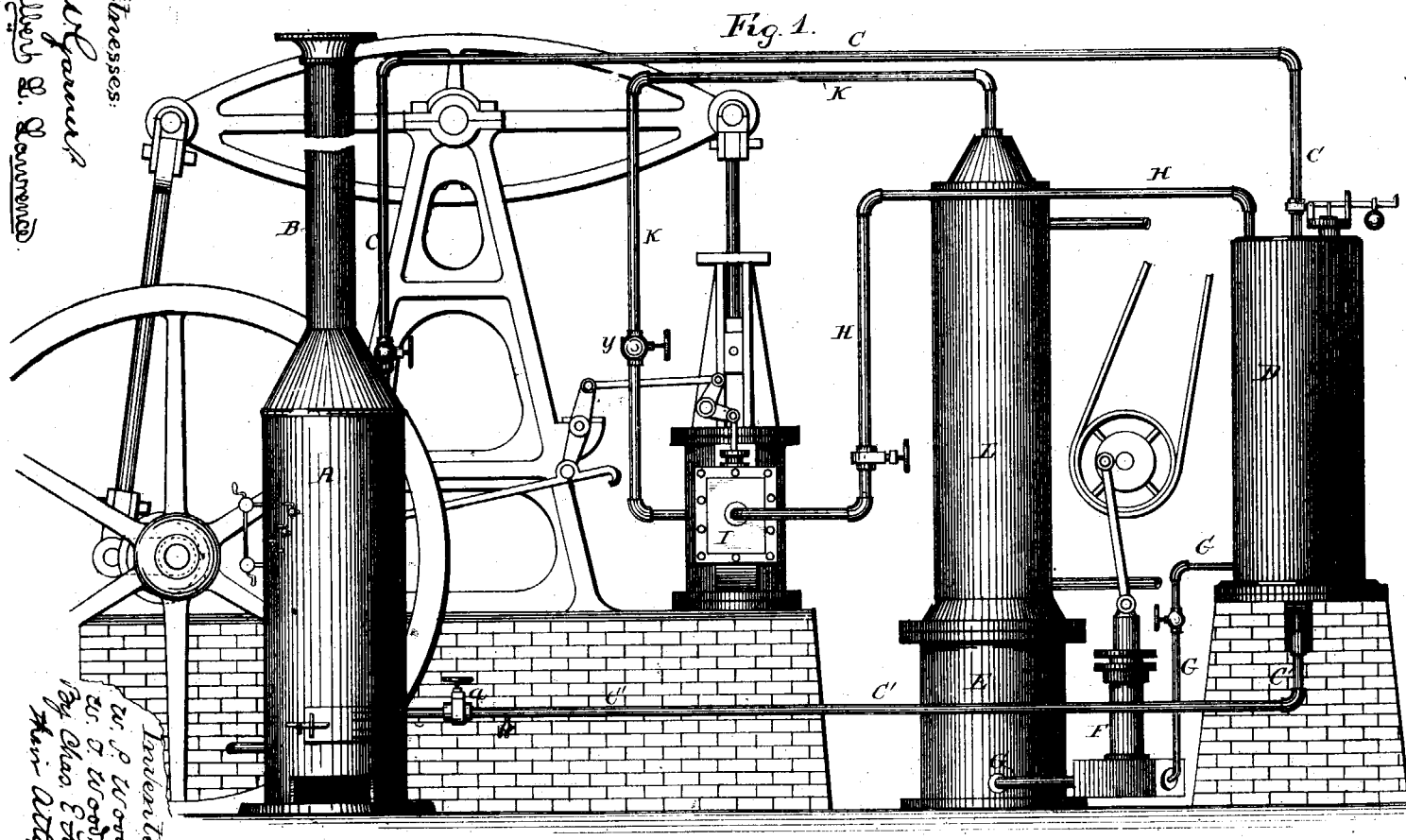
Witnesses:
J. W. Garner
Albert L. Lawrence
Inventors:
W. P. Wood,
W. T. Wood,
By Chas. E. Foster,
Their Atty.

2 Sheets—Sheet 2.
W. P. & W. T WOOD,
Assignors, by mesne assignments, to I. R. BLUMENBERG,
Vapor Engine.
No. 9,400. Reissued Oct. 5, 1880.
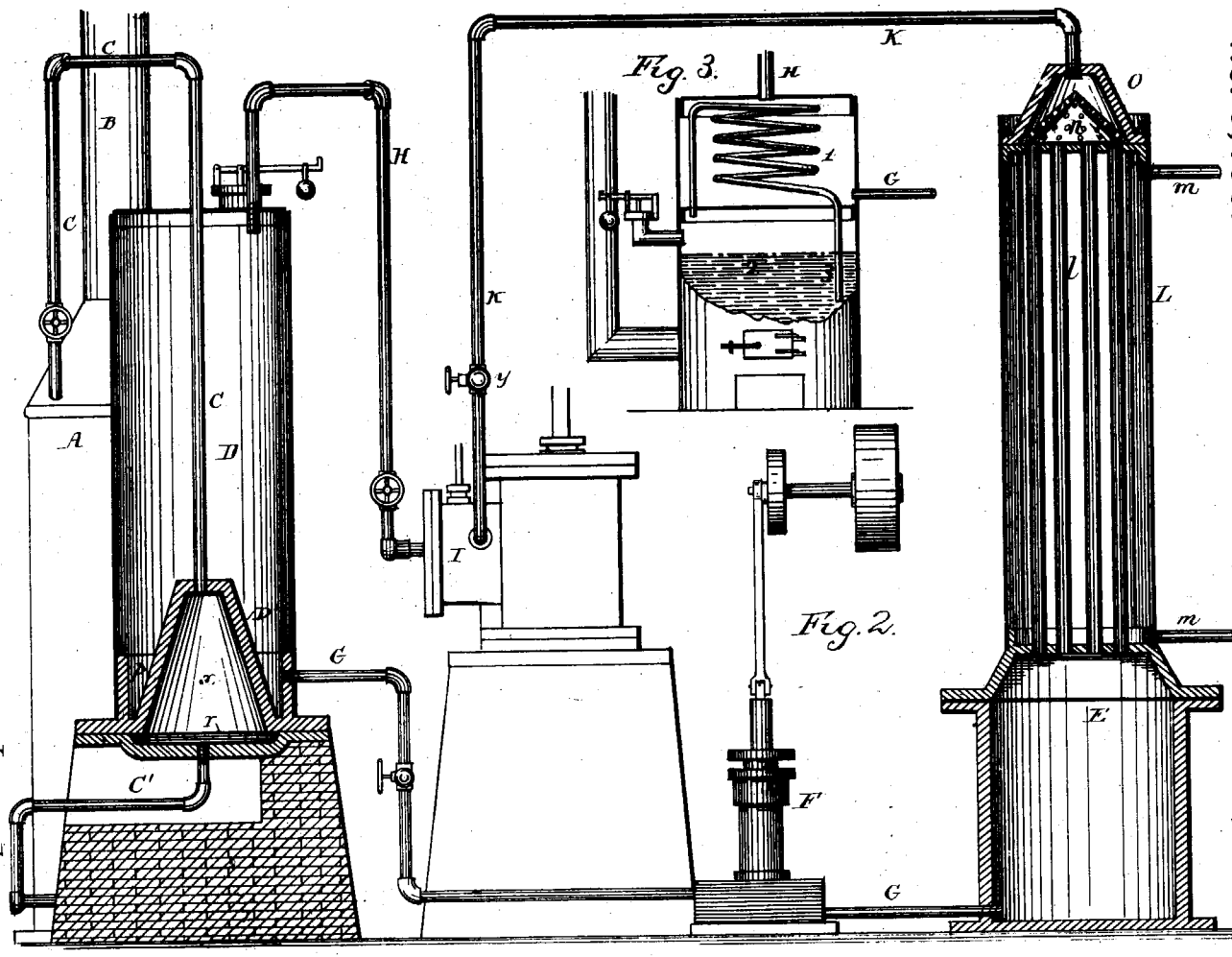
Witnesses:
J. W. Garner
Albert L. Lawrence
Inventors:
W. P. Wood,
W. T. Wood,
By Chas. E. Foster,
their Atty.

UNITED STATES PATENT OFFICE.

WILLIAM P. WOOD AND WILLIAM T. WOOD, OF WASHINGTON, DISTRICT OF COLUMBIA, ASSIGNORS, BY MESNE ASSIGNMENTS, TO ISRAEL R. BLUMENBERG, OF SAME PLACE.

VAPOR-ENGINE.

SPECIFICATION forming part of Reissued Letters Patent No. 9,400, dated October 5, 1880.

Original No. 217,665, dated July 15, 1879. Application for reissue filed April 7, 1880.

*To all whom it may concern:*

Be it known that we, WILLIAM P. WOOD and WILLIAM T. WOOD, of Washington, District of Columbia, have invented an Improvement in Utilizing Volatile Substances for Operating Vapor-Engines, of which the following is a specification.

The object of our invention is to utilize for motive-power purposes a class of substances, including bisulphide of carbon and ammonia, which form vapors of high tension by the application of a low degree of heat, and are then readily condensed, thereby rendering effective the greater part of the heat employed; and our invention has for its object to secure these results without the dangers heretofore incident to the utilizing of such substances, and without the use of complicated and costly mechanisms heretofore proposed for the purpose.

In the drawings forming part of this specification we have shown, in Figure 1, an outside elevation, and in Fig. 2 a sectional elevation, of an engine which we have devised for carrying out our improved mode of utilizing bisulphide of carbon or equivalent substances or compounds for motor purposes; and in Fig. 3 we have illustrated another form of apparatus for the like purpose.

While it is not necessary to adopt any particular construction, and while we do not limit ourselves to the specific constructions shown and hereinafter described, there are in any form of mechanism which may be used six elements which we believe essential to the carrying out of our invention, to wit, first, an engine of any construction adapting it to be operated by the high-tension vapor generated; second, a vaporizer of a capacity to receive a number of charges of fluid, and into which the motor fluid is injected as required; third, means for injecting the fluid automatically; fourth, means for heating the vaporizer; fifth, a condenser; sixth, a reservoir for the main supply of volatile motor fluid.

These features may be embodied in any forms of appliances capable of securing the required results, and the various appliances may be located relatively as may be found most advantageous.

We use the term "vaporizer" as indicating a vessel capable of receiving numerous charges of liquid, and into which each charge of liquid introduced is, by its contact with the heated metal, instantly converted into vapor and retained, in contradistinction to that class of generators heretofore used, commonly termed "boilers," which serve as reservoirs for quantities of liquid from which the vapor is gradually evolved by boiling the mass, and in contradistinction to flashing-chambers, where each charge is vaporized and the vapor used before introducing another charge.

In the apparatus shown in the drawings, A is the ordinary upright steam-boiler; B, the smoke-stack; C, the steam-pipe, and D the vaporizer, which is a strong vessel, larger than the cylinder of the engine, provided with a cone-shaped heating bottom piece, D′, made of bronze or other suitable material, closed at the lower end by a cap, *r*, which, with the said bottom piece, forms a chamber, *x*, into which steam or water passes from the boiler through the pipe C, and from which it flows, with the water of condensation, back to the boiler, thus maintaining such continuous circulation of hot fluid from the boiler as will insure the proper degree of heat in the vaporizer.

The supply of volatile compound, instead of being mainly contained in the generator, as heretofore, is placed in a reservoir, E, and in the pipe G, forming a communication between the reservoir and vaporizer, is placed a suitable pump, F, arranged to be operated from the engine, and serving as a means of forcing the liquid from the reservoir against the heated plates of the vaporizer, where it is instantly converted into vapor. The vapor from the vaporizer passes through the pipe H to the steam-chest I of the engine, where it performs its office by operating the same, the exhaust passing to a condenser, L, and thence back to the reservoir. The condenser is provided with the usual tubes *l l* and cold-water circuit-pipes *m*.

The various pipes or connections are supplied with cocks to properly control the passage of the fluids.

At the first starting of the engine we use a hand-lever to operate the pump and inject into the vaporizer one or more charges of fluid, which is driven against the heated plates of the vaporizer and instantly converted into a vapor at a pressure depending upon the quantity injected. After starting the engine the action of the pump supplies continuously additional charges of liquid, each of which is injected and vaporized, the vapor passing to the cylinder and continuing the operation of the engine at a pressure depending upon the quantity of liquid vaporized. After the operations are discontinued and the temperature of the vaporizer reduced the vapor therein condenses, forming sufficient liquid to start the engine when a fire is again kindled.

While repeated efforts have been made during many years to utilize highly volatile substances as motors, and while it has been shown that vapors of high tension can be readily generated from such substances by the application of a comparatively small degree of heat, and that the vapors, after performing their office in the engine, can be again reduced to a liquid form by the application of simple and inexpensive appliances, yet notwithstanding these facts the difficulties incident to the practical application of such substances as motors have been very great and well nigh insurmountable. Chief among these difficulties has been the danger resulting from the ready generation of vapor of high tension, rendering one of the most valuable qualities of such substance the chief source of objection to their use. Thus in any ordinary vapor-engine the rapid evolution of vapor in the generator during the operation of the engine—a desirable source of power while the engine is performing its work—will, on the stopping of the engine, subject the generator to a dangerously sudden and rapid increase of pressure.

It will be obvious that in the above-described method of utilizing the material no such result can ensue, for at no time, without an increase of temperature, can there be in the vaporizer a greater degree of pressure than results from the complete evaporation of the charge of liquid pumped upon the heated plate, and the amount of such charge is completely under the control of the attendant, and once adjusted is attended with an invariable result. If, for instance, previous to starting, such a charge is injected into the vaporizer as will, when completely vaporized at a given temperature, generate a vapor under a pressure of one hundred and forty pounds, and if after the engine is started it automatically pumps into the vaporizer just sufficient liquid to furnish a motive vapor in volumes required for the continued operation of the engine, the pressure within the vaporizer will not vary, whatever may be the speed of the engine; and if the motion of the engine is suddenly arrested no sudden increase of pressure can occur, for there has been no increase of liquid in the vaporizer, nor can any be unknowingly added during the time the engine is at rest, and no increase of vapor can occur where there is no more liquid to be vaporized.

By this means we overcome the main, and in fact almost only, danger in utilizing highly volatile fluids as sources of motive power, and which is an invariable accompaniment of all modes involving the generation of a gas by the heating at one time of a greater mass of liquid than can be instantly vaporized.

It will be seen that in carrying out our invention a necessary result is to maintain a generator empty of fluid—that is, no such quantity of the compound is introduced as will retain its liquid form in the generator. The latter, therefore, is not a reservoir of liquid, but simply a vessel containing only such a volume of gas or vapor as will suffice for the continued operation of the engine without materially reducing the pressure, but containing in itself no store or supply of liquid.

Our invention must be distinguished from the mode of generating vapor by injecting the compound into steam or other hot fluid, which would produce a mixed vapor, and from what are known as "flashers," in which it has been proposed to inject water against heated plates, forming at each injection sufficient steam for the movement of the engine, but maintaining no initial pressure, and incapable, when water is used, of maintaining such uniform pressure as can be secured by the use of bisulphide of carbon.

Our invention must also be distinguished from the aforesaid modes of using volatile liquids—as, for instance, that described in English Patent No. 902 of 1858, in which it is proposed to pump an indefinite quantity of liquid into the boiler before starting, and to add periodically sufficient to supply the engine.

In all such modes heretofore proposed, and, so far as we know, never carried out, or capable of being carried out, no attempt is made to maintain the generator free from liquid, and it is obvious that if more than can be vaporized by the heat of the generator is pumped in at first, and if the quantity requisite for each movement is then added at each stroke, there will be a surplus of liquid capable of generating additional volumes of vapor and dangerously increasing the pressure on an increase of heat.

Our improved mode of operation is distinguished from that set forth by maintaining the generator free from liquid not only during the operation, but on starting, so that the initial pressure, being secured by the volatilization of all the liquid, cannot be materially increased by an increase of heat.

In Fig. 3, Sheet 2 of the drawings, we have shown a modification of our apparatus useful in running engines of small power. In this modification the vaporizer 1 is within the boiler above the hot-water chamber 2, the hot-water or steam circulation being by a coil, 3. Against this coil the pipe G injects the bisulphide of carbon and the vapor passes out for service through pipe H, as before described.

The supply-reservoir E is filled with bisulphide of carbon or other compound in any suitable manner, preferably by a valved funnel-pipe. It also, as shown, receives drip from the condenser.

A sight-gage or other appliance may be used to determine the quantity of the compound in the reservoir.

We claim—

1. The within-described mode of utilizing volatile liquids in operating vapor-engines, the same consisting in securing an initial pressure in a vaporizer by wholly volatilizing a portion of liquid therein, and thereafter introducing additional charges in quantities sufficient to maintain the required pressure without permitting the material to retain a liquid form in the vaporizer, all substantially as set forth.

2. In apparatus for utilizing volatile liquids as motors, the vaporizing-chamber D, provided with a heating cup or cone, D′, in combination with the steam or hot-water conduit C and the volatile-liquid conduit G and the engine-connection H, substantially as and for the purposes described.

3. In apparatus for utilizing volatile liquids as motors, the boiler A, steam-conduit C, the vaporizer D′, and the return-pipe C′, whereby to maintain the circuit of the steam or hot water, substantially as described.

4. A vapor-engine consisting of a steam-boiler, A, an independent vaporizing-chamber, a heater therefor, a reservoir for the volatile liquid, circuit-pipes leading from said boiler to the heater of said vaporizer, circuit-pipes connecting the vaporizer, condenser, reservoir, and engine, and a pump arranged for operation substantially as herein set forth.

In testimony whereof we have signed our names to this specification in the presence o two subscribing witnesses.

WILLIAM P. WOOD.
WILLIAM T. WOOD.

Witnesses:
CHARLES E. FOSTER,
FRANK M. GREEN.